United States Patent
Gieseke

(10) Patent No.: US 9,269,263 B2
(45) Date of Patent: Feb. 23, 2016

(54) VEHICLE TOP CLEARANCE ALERT SYSTEM

(71) Applicant: MAGNA ELECTRONICS INC., Auburn Hills, MI (US)

(72) Inventor: Achim Gieseke, Gross-Umstadt (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 445 days.

(21) Appl. No.: 13/774,317

(22) Filed: Feb. 22, 2013

(65) Prior Publication Data
US 2013/0222592 A1  Aug. 29, 2013

Related U.S. Application Data

(60) Provisional application No. 61/602,876, filed on Feb. 24, 2012.

(51) Int. Cl.
| | |
|---|---|
| *H04N 7/18* | (2006.01) |
| *H04N 5/77* | (2006.01) |
| *G08G 1/0967* | (2006.01) |
| *G08G 1/04* | (2006.01) |
| *G08G 1/16* | (2006.01) |

(52) U.S. Cl.
CPC ............ *G08G 1/096766* (2013.01); *G08G 1/04* (2013.01); *G08G 1/165* (2013.01)

(58) Field of Classification Search
None
See application file for complete search history.

(56) References Cited

U.S. PATENT DOCUMENTS

| | | | |
|---|---|---|---|
| 3,896,414 A * | 7/1975 | Rulo | 340/942 |
| 5,550,677 A | 8/1996 | Schofield et al. | |
| 5,670,935 A | 9/1997 | Schofield et al. | |
| 5,710,553 A * | 1/1998 | Soares | 340/903 |
| 5,949,331 A | 9/1999 | Schofield et al. | |
| 7,038,577 B2 | 5/2006 | Pawlicki et al. | |
| 7,528,738 B1 * | 5/2009 | Garrett, Sr. | 340/905 |
| 7,720,580 B2 | 5/2010 | Higgins-Luthman | |
| 7,855,755 B2 | 12/2010 | Weller et al. | |
| 8,027,029 B2 | 9/2011 | Lu et al. | |
| 8,217,830 B2 | 7/2012 | Lynam | |
| 8,600,606 B2 | 12/2013 | Nickolaou et al. | |
| 9,068,390 B2 | 6/2015 | Ihlenburg et al. | |
| 2004/0201495 A1 * | 10/2004 | Lim et al. | 340/905 |
| 2005/0012603 A1 * | 1/2005 | Ewerhart et al. | 340/435 |
| 2007/0103282 A1 * | 5/2007 | Caird et al. | 340/435 |
| 2009/0121852 A1 * | 5/2009 | Breuer et al. | 340/436 |

(Continued)

FOREIGN PATENT DOCUMENTS

| | | |
|---|---|---|
| DE | 102010012662 | 1/2011 |
| EP | 2416115 | 2/2012 |

*Primary Examiner* — Hung Dang
(74) *Attorney, Agent, or Firm* — Gardner, Linn, Burkhart & Flory, LLP

(57) ABSTRACT

A vehicle clearance alert system includes at least one sensor or camera disposed at a vehicle and having an exterior field of view in a direction of travel of the vehicle. A control is responsive to the camera and is operable to determine a height dimension of a structure in the path of travel of the vehicle. The control is operable, responsive to (i) the determined height dimension of a structure in the path of travel of the vehicle and (ii) a height dimension of the vehicle, to determine if there is sufficient clearance between the structure and the vehicle for the vehicle to pass under the structure. Responsive to a determination that there is not sufficient clearance between the structure and the vehicle for the vehicle to pass under the structure, the alert system is operable to generate an alert to the driver of the vehicle.

25 Claims, 9 Drawing Sheets

(56) References Cited

U.S. PATENT DOCUMENTS

| | | | |
|---|---|---|---|
| 2009/0140881 A1* | 6/2009 | Sakai et al. | 340/901 |
| 2009/0189373 A1* | 7/2009 | Schramm et al. | 280/731 |
| 2011/0043633 A1 | 2/2011 | Sarioglu et al. | |
| 2012/0299712 A1* | 11/2012 | Sowa | G08G 1/165 340/435 |
| 2013/0093583 A1* | 4/2013 | Shapiro | 340/436 |
| 2013/0116859 A1 | 5/2013 | Ihlenburg et al. | |
| 2014/0067206 A1 | 3/2014 | Pflug | |
| 2014/0160276 A1 | 6/2014 | Pliefke | |
| 2014/0168415 A1 | 6/2014 | Ihlenburg et al. | |
| 2014/0168437 A1 | 6/2014 | Rother | |
| 2014/0218529 A1 | 8/2014 | Mahmoud et al. | |
| 2014/0313339 A1 | 10/2014 | Diessner | |
| 2014/0340510 A1 | 11/2014 | Ihlenburg | |

\* cited by examiner

VEHICLE TOP CLEARANCE ALERT SYSTEM

CROSS REFERENCE TO RELATED APPLICATION

The present application claims the filing benefit of U.S. provisional application Ser. No. 61/602,876, filed Feb. 24, 2012, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides an alert system for a vehicle that utilizes one or more sensors, such as cameras or ultrasonic sensors or radar sensors or the like, to determine a clearance of the vehicle relative to a structure or object that the vehicle is approaching, such as a tunnel or tree branch or bridge or the like, and to provide a warning or alert to the driver of the vehicle if there is insufficient clearance for the vehicle to pass under the detected object. The alert system may include or be associated with a vehicle vision system that utilizes one or more cameras to capture images exterior of the vehicle, and provides the communication/data signals, including camera data or image data that may be displayed or processed to provide the desired display images and/or processing and control, depending on the particular application of the camera and vision or imaging system.

According to an aspect of the present invention, a vehicle alert system includes a sensor, such as a camera, with a field of view forward of the vehicle. The camera is disposed at a vehicle and has an exterior field of view in a direction of travel of the vehicle (such as a forward facing camera viewing in the forward direction of travel of the vehicle), and a control is responsive to the camera. The control is operable, via image processing of image data captured by the camera, to determine a height dimension of a structure in the path of travel of the vehicle. The control is operable, responsive to (i) the determined height dimension of a structure in the path of travel of the vehicle and (ii) a height dimension of the vehicle, to determine if there is sufficient clearance between the structure and the vehicle for the vehicle to pass under the structure. Responsive to a determination that there is not sufficient clearance between the structure and the vehicle for the vehicle to pass under the structure, the alert system is operable to generate an alert to the driver of the vehicle.

Optionally, the control may be operable to determine a height dimension of the vehicle via processing of image data captured by at least one camera or imaging sensor of the vehicle. For example, the control may be operable to determine a height dimension of the vehicle (with a load or object disposed thereon) via processing of captured image data and based at least in part on a known height of the vehicle when not loaded. The control may be operable to determine a height dimension of the vehicle via processing of captured image data that is representative of a shadow and/or a reflected image of the vehicle and loaded object.

Optionally, the control may be operable to determine a height dimension of a structure in the path of travel of the vehicle via (i) processing of data captured by the at least one camera and (ii) information generated by a navigation system of the vehicle. Responsive to a determination that there is not sufficient clearance between the structure and the vehicle for the vehicle to pass under the structure, the alert system may be operable to generate a graphic overlay at a displayed image to visually alert the driver of the vehicle of the determined insufficient clearance (or may otherwise alert the driver of the hazard, such as via an audible alert or a haptic alert or the like).

These and other objects, advantages, purposes and features of the present invention will become apparent upon review of the following specification in conjunction with the drawings.

DESCRIPTION OF THE PREFERRED EMBODIMENTS

A driver assist system and/or vision system and/or object detection system and/or alert system may operate to capture images or detect objects exterior of the vehicle and process the captured data to detect objects in front of the vehicle and in the predicted path of the vehicle, such as to alert the driver of the vehicle if there is insufficient clearance above the vehicle to the detected object. The object detection may utilize detection and analysis of moving vectors representative of objects detected in the field of view of the vehicle camera, in order to determine which detected objects are objects of interest to the driver of the vehicle.

Figure 1:
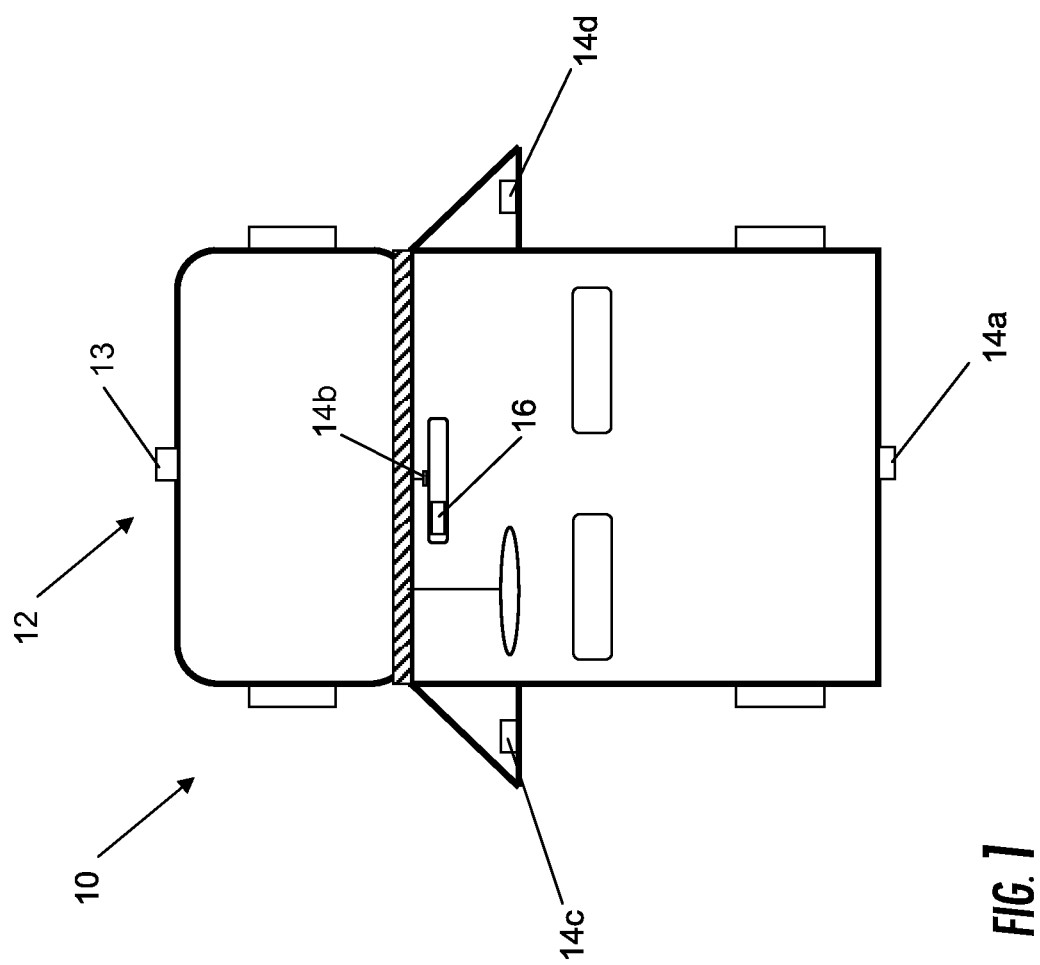
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes a sensing system or imaging system or vision system 12 that includes a forward facing sensor 13 (such as a camera or other object detecting sensor, such as a radar sensor or ultrasonic sensor or the like). The sensing system 12 may also include one or more other imaging sensors or cameras (such as a rearward facing imaging sensor or camera 14a and/or a forwardly facing camera 14b at the front of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The sensing system 12 is operable to process image data captured by the forward facing sensor and may provide displayed images at a display device 16 for viewing by the driver of the vehicle. The sensing system processes captured data to detect objects, such as objects forward of the vehicle during forward driving or such as objects to the rear of the subject or equipped vehicle during a reversing maneuver, and is operable to determine if there is clearance for the vehicle to continue on its travel path without interference by the detected object (such as an overhanging tree branch or a tunnel or a bridge or the like).

Driver assistance vision systems do not have cameras or sensors on the roof for measuring the height of the vehicle. Display modes showing the subject or host vehicle from an outside top view do not show any load (such as a car top carrier or the like) on the rooftop of the vehicle; rather, they suggest having no load on the top of the vehicle since the superimposed car within the top view is typically just an (offline generated) overlay. Navigation systems using historical map data may be capable of providing warnings for maximal pathing heights along a selected or programmed route of travel of the vehicle. However, such systems are operable to warn about only such critical spots that were stored in the map earlier. For example, a navigation system that is navigating the vehicle towards a tunnel that has a known low or reduced height or clearance (and that has such reduced height input as data in the navigation system's map data), may be operable to provide an alert to the driver of the vehicle of the low height information. Such an alert would be based solely on previously stored tunnel or bridge height data and would not be effected by the actual height dimension of the subject vehicle.

Optical sensors, such as cameras, infrared cameras, laser scanners/LIDAR sensors, LADAR sensors, RADAR short and long range sensors, ultrasound sensors and the like, are known for driver assistance systems in vehicles. Object detection and size estimation features are also provided by driver assistance systems in vehicles. Also, virtual driving paths are known that provide a horizontal view, but not known combined with a vertical view.

Vehicles, especially passenger cars and trucks and the like, have a specific height by nature (for that particular vehicle car line and trim and when unloaded and with the tires at a particular inflation). Adding payload or baggage to the roof top of the vehicle increases the total height dimension of the vehicle above its typical or designed height. Thus, when so loaded, the clearance when the vehicle underpasses bridges, parking garage entries and the like may be exceeded. Thus, the vehicle driver has to estimate the vehicle clearance height, and keep in mind that the vehicle may have a high and/or wide load on top when driving the vehicle passing low and/or narrow objects or structures. If the driver forgets that a load is being carried on top of the vehicle, and drives under a low height or reduced height structure, the cartop load or carrier may impact the structure, causing damage to the load (such as luggage or bicycles or kayaks or the like) or to the structure itself.

The present invention provides a driver assistance and warning (and optionally intervention) system that has the capability to detect the clearance of the (intended) driving path in front of the vehicle when the vehicle is driven forward and/or to the rear of the vehicle when the vehicle is driven backward. The intended path of the vehicle may be projected or estimated by the current steering wheel steering angle, or the vehicle's current direction, or the chosen or programmed path on a navigation system, or such as may be provided in real time by a remote server for path determination, such as by utilizing aspects of the systems described in U.S. patent application Ser. No. 13/660,306, filed Oct. 25, 2012, which is hereby incorporated herein in its entirety, and such a path may be influenced by other driver assistance systems or interventions, such as, for example, a lane change assistance system or the like.

The maximum width and height of the driving path is detected by processing forward or rearward sensor data (captured by forward or rearward facing sensors). Such sensor data may be captured by any suitable forward or rearward facing sensors, such as optical sensors such as image sensors or cameras, infrared cameras, laser scanners/LIDAR sensors, LADAR sensors, RADAR short and long range sensors, ultrasound sensors, and/or the like. The data processor may be operable to use one sensor, or a part of a sensor, or multiple ones of these sensors or all of these sensors by sensor fusion (where the data captured by the sensors is fused into a single data base for processing by the processor). Driver assistance systems are typically capable to process a 3D-world reconstruction, such as by being able to detect the size, distance and speed of objects within the detection range in front of the subject or host vehicle, with this information typically being used for collision avoidance, and particularly for collision avoidance of other traffic participants. Stereometric views may be added or provided, but such views are not typically necessary.

Object detection algorithms may use several optical effects, such as, for example, triangulation, which may compare the scene changes between consecutively captured sensor (of every kind) images or frames (such as by utilizing aspects of the systems described in German Publication No. DE102010012662, which is hereby incorporated herein by reference in its entirety, and such as by utilizing aspects of the systems described in PCT Application No. PCT/US2012/066570, filed Nov. 27, 2012, and/or PCT Application No. PCT/US2012/066571, filed Nov. 27, 2012, which are hereby incorporated herein by reference in their entireties), or which may compare two images taken at the same time with two different viewing angles (such as via a stereometric sensing system). Other methods may use focal distances, pulse reflection durations or Doppler effects to determine changes in the captured data or frames or detect objects within their detection range.

The alert system of the present invention is operable to use object detection results to determine the gaps or gap dimensions (1D) or area (2D) between the detected objects to be the space the host vehicle has for passing. By subtracting the vehicle's width from the width or lateral dimension of the passing gap and similarly subtracting the vehicle's height from the passing gap's height dimension, the system can determine whether there is sufficient clearance or if passing the detected object or objects is critical or precluded. The passing area may be processed as a virtual driving tunnel, adding an area segment to the very front of the tunnel when a calculation cycle is done. The tunnel would be limited by the detection range, resolution and data computing time of the system and its sensors. Some sensor's data area segments may emerge early, but will become clearer and more reliable as the vehicle approaches the virtual area segment.

Figure 4:
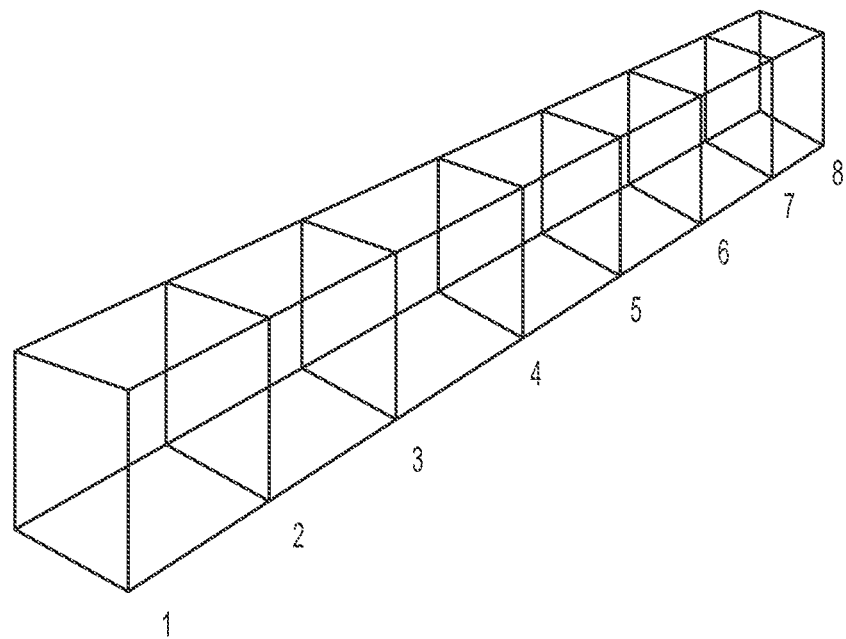
FIG. 4 is a perspective view of a virtual driving tunnel, where the environment in front of the driving path becomes consecutively captured and a virtual pathing area, indicated in FIG. 4 as a square, becomes produced by the clearance algorithm (which is accomplished via machine vision and is not presented to the driver)
Figure 5:
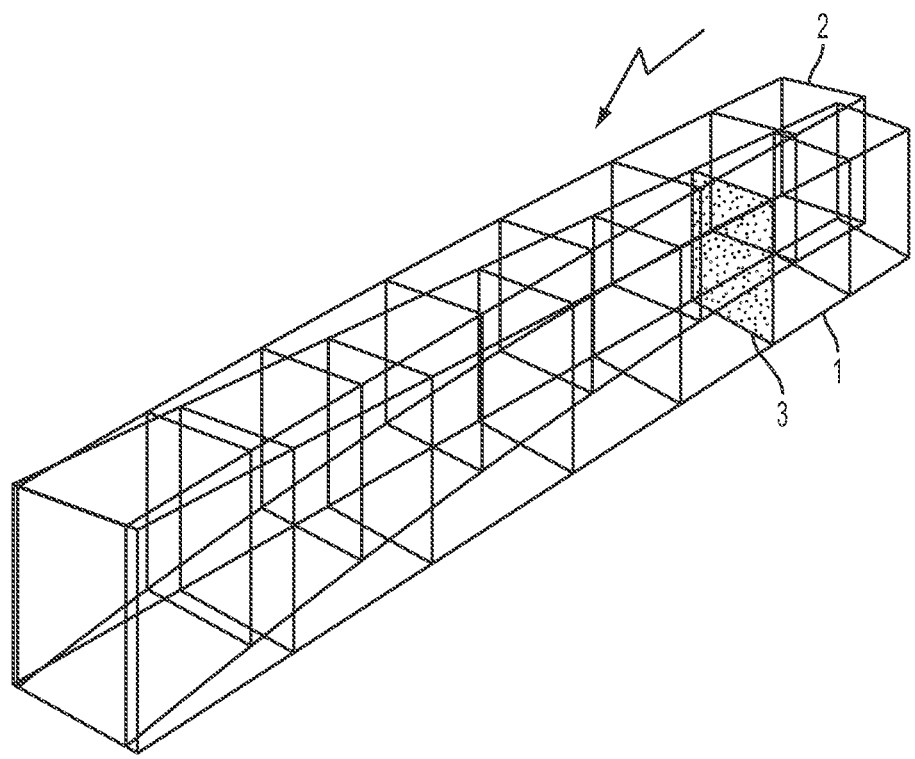
FIG. 5 is another perspective view of the virtual driving tunnel of FIG. 4, showing that once an infringement (3) of a driving path (1) is detected, potential avoiding paths (2) become presumed (here just one shown), with such detection and presumptions being accomplished via machine vision, and not presented to the driver.

For example, and as shown in FIG. 4, a virtual driving tunnel is established where the environment in front of the vehicle and along its driving path becomes consecutively captured, and a virtual pathing area, shown as a square in FIG. 4, is generated by the clearance algorithm (which is accomplished via machine vision and is not presented to the driver). As shown in FIG. 5, when an infringement (3) of the driving path (1) is detected (such as a low structure or object or the like), potential avoiding paths (2) are generated, with such detection and presumptions being accomplished via machine vision or data processing. Alternative driving tunnels may be composed (such as a precalculated look up table or during the run time or data capturing) assuming necessary driving interactions. Such a method is commonly referred to as "influence mapping", and is described in the systems described in U.S. provisional application Ser. No. 61/696,416, filed Sep. 4, 2012, which is hereby incorporated herein by reference in its entirety. The algorithm may calculate the latest warning time and the latest (automated) intervention moment.

When the system detects a critical passing clearance or too narrow an approach to an object on one side, the system may be operable to: (1a) signal to the driver by a warning sound, (1b) signal to the driver by a haptic imprint such as vibrating of the steering wheel or foot pedal, (2a) signal to the driver by highlighting, such as by activating a warning sign or icon or emblem at a video mirror display or other in-cabin display or head up display device or the like, (2b) signal to the driver by putting an overlay onto the scene ahead (such as within a heads up display or video mirror display or the like), with the overlay optionally comprising a color, such as a red (or other) color, or a flashing or blinking overlay, or the like, which functions to attract the driver's attention, (3) control the vehicle steering (such as consecutive to one or more of the above options) to provide a steering intervention to bypass the critical object, and/or (4) control the vehicle braking to slow or stop the vehicle before reaching the detected too narrow spot.

The alert system of the present invention is operable to check the clearance height against the height of the subject vehicle and any additional baggage carried atop the vehicle, or the height of a truck with any additional payload that may protrude above the height of the truck when unloaded, and/or may check the passage width relative to the width of the subject vehicle as well.

The total vehicle height may be entered by the user via a user interface of the vehicle's driver assistance system or via a remote device with HMI. For example, the vehicle's general height without additional structures on top would be the default value (and optionally and desirably adjusted or corrected by small amounts when changing tires and the like, which may affect the actual height of the vehicle). Optionally, the vehicle's height may be estimated or roughly measured by calculating the baggage's height by processing captured images in reflections of the subject vehicle with the baggage on top in window fronts, such as via processing captured data (such as captured image data) as captured by front, side and/or rear sensors, preferably a vehicle vision system's cameras or the like. Such estimation or measurement may be accomplished via triangulation or by comparing the ratio of the (known) vehicle's own height to the (unknown) baggage's height and estimating the baggage height and overall height based on such a ratio (such as by utilizing aspects of the systems described in European Publication No. EP 0 00002416115, which is hereby incorporated herein by reference in its entirety).

Figure 2:
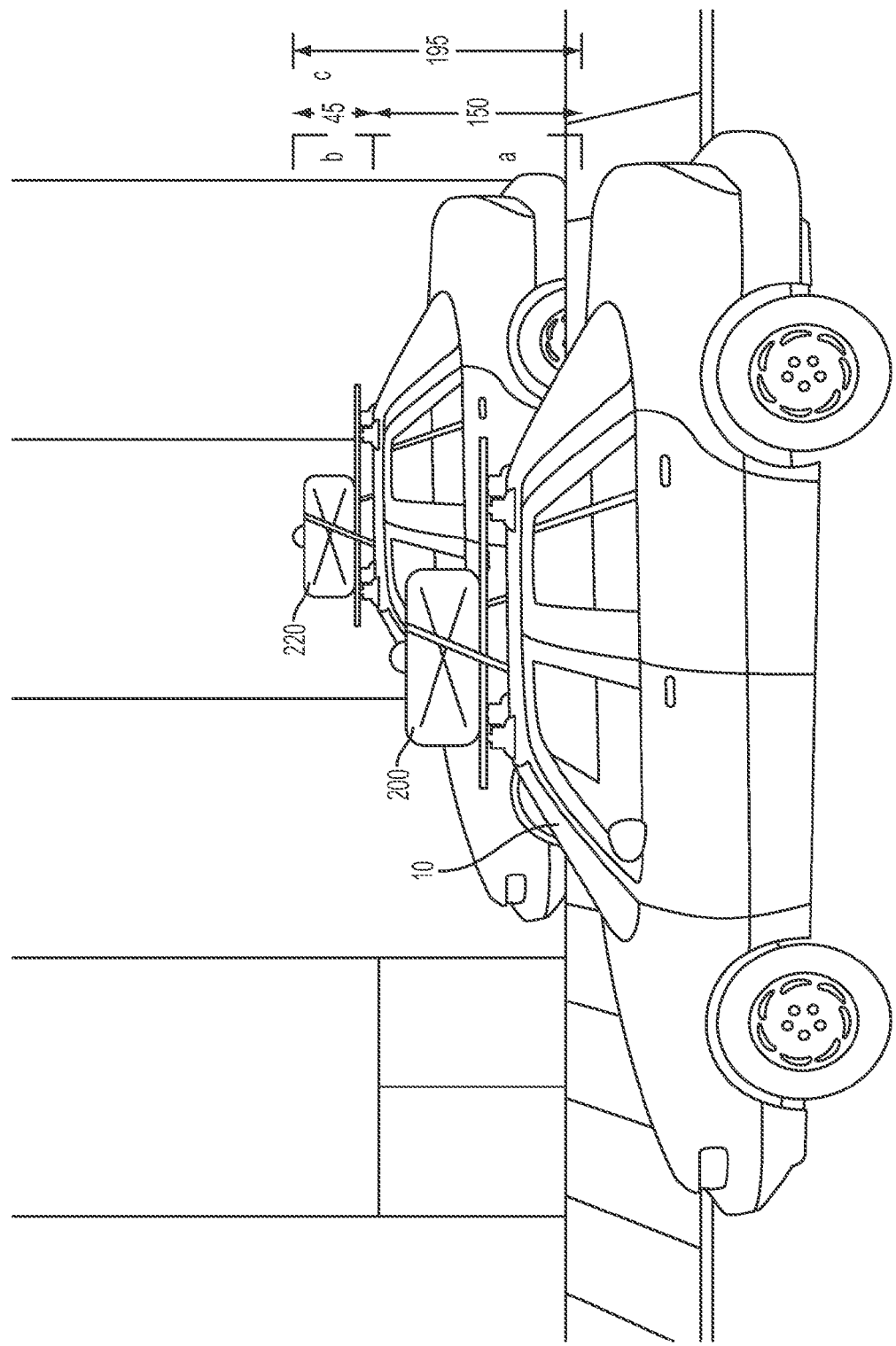
FIG. 2 is a side elevation of a vehicle (I) with a height (a) and carrying baggage on the roof top with a height (b), which increases the total vehicle height (c), and showing a reflection of the vehicle in a building window pane (II) that may be captured by the vehicle's vision cameras for processing the height determination algorithm.

For example, and with reference to FIG. 2, the vehicle 10 may have a load 200 carried thereon, and the system may be operable to detect a reflected image 220 of the loaded vehicle and process the captured image data. As can be seen in FIG. 2, the system may determine a ratio between the height of the vehicle (a) in the reflected image and the height of the load (b) in the reflected image. Because the actual height of the vehicle is roughly known (based on manufacturer's data or the like), the system thus may calculate the height of the load and the overall height of the loaded vehicle by processing captured image data that is representative of a reflection of the loaded vehicle. For example, the system may utilize a known or stored value of the vehicle's height (which may be stored in a memory device or digital storage device at the vehicle) to determine the overall height of the loaded vehicle via a ratio determination or calculation or the like. The system may also be operable to take into account any degree of distortion that may be in the reflected image, such as by comparing a ratio of known tire height to known vehicle height to a ratio of the reflected tire to reflective vehicle, in order to determine any vertical distortion that may occur in the reflected image (such as via the wall or glass at which the reflection is captured being at an angle relative to the road or vehicle), and then adjusting the overall height calculation accordingly.

Figure 3:
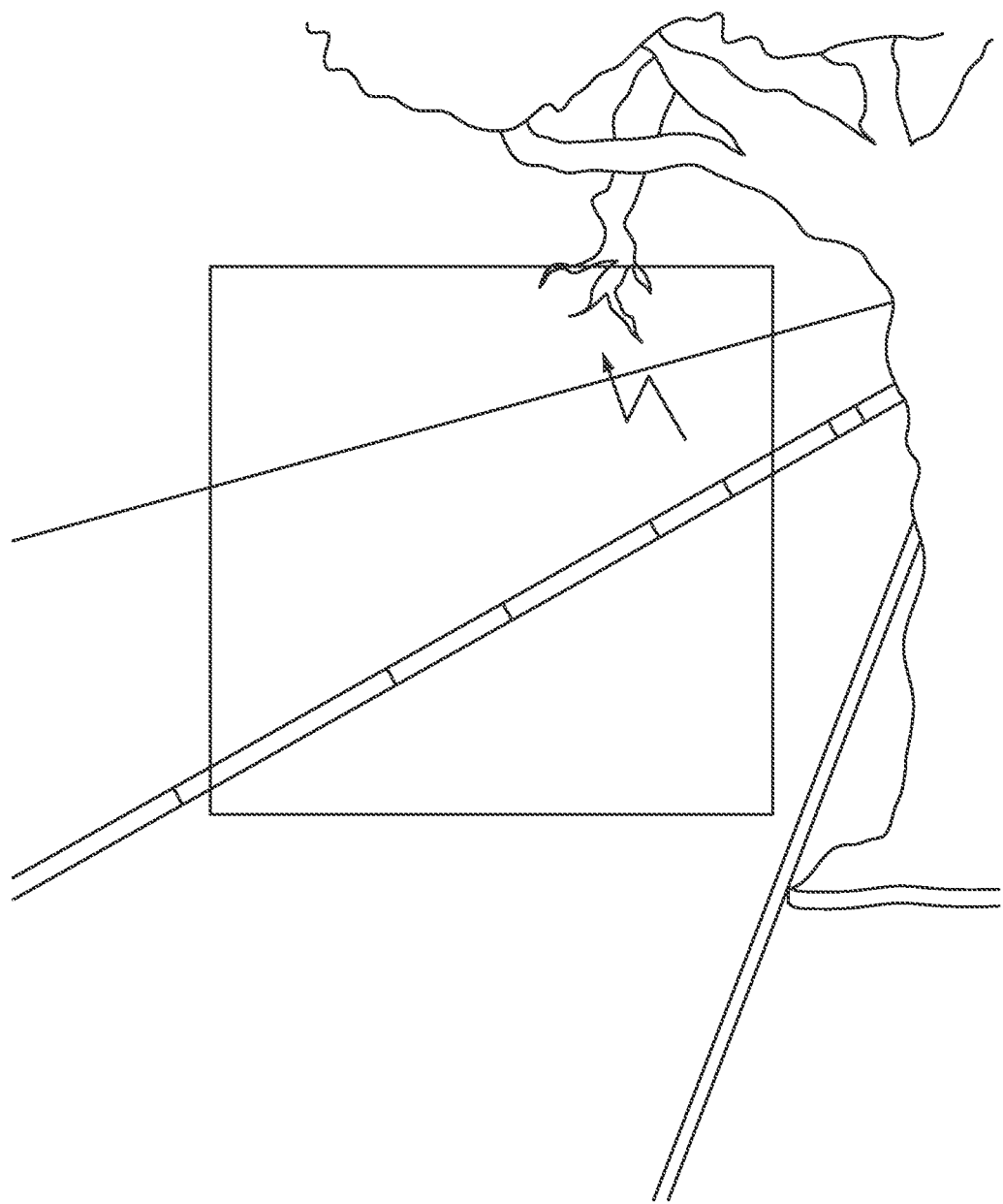
FIG. 3 shows a virtual driving path area which becomes infringed by a low hanging tree branch, showing an arrow overlayed to the scene or image that highlights the hazard on the driver driver's head up display or other display.
Figure 6:
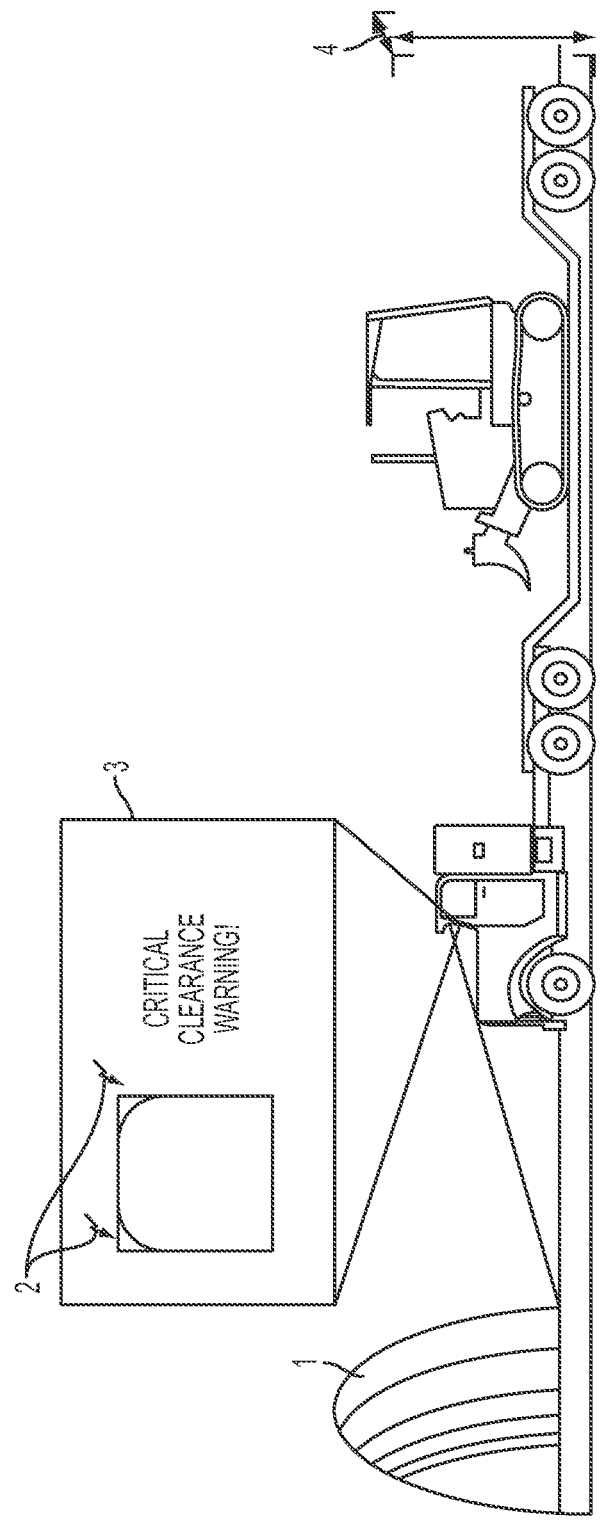
FIG. 6 is a side elevation of a wide/high load truck as it is approaching a bridge underpath (1), and when the measured width (4) or height exceeds the detected clearance, the in-vehicle display (3) displays a warning massage (2), such as a picture or image or text or icon or the like, that may flash or otherwise be highlighted to the driver.

Optionally, an alert or graphic overlay may be generated when the system detects a height of a structure or object that is potentially insufficient for safe passage underneath by the vehicle. For example, and with reference to FIG. 3, the system may detect when a virtual driving path area becomes infringed by a low hanging tree branch, and may provide an arrow or other icon or image or visual alert that is overlayed on the scene or image (such as via a heads up display of the vehicle so that the overlay is generally at or near the detected low hanging object or low structure) to highlight the hazard for viewing by the driver of the vehicle. Optionally, and with reference to FIG. 6, the system may detect when a tunnel or structure ahead of the vehicle (or otherwise in the path of travel of the vehicle) is too narrow and/or low for safe passage of the vehicle (as the vehicle may be presently loaded). As shown in FIG. 6, when a loaded truck or vehicle approaches a bridge underpass (1), and when the measured width (4) exceeds the detected clearance, the in-vehicle display (3) may display a warning massage (2), such as a picture or image or text or icon or the like, that may flash or otherwise be highlighted to the driver. In the illustrated embodiment, the display may highlight the portions of the tunnel or structure that the system determines may be impacted by the vehicle or its load, so that the driver of the vehicle is readily alerted to the hazardous condition before the vehicle arrives at the structure.

Optionally, the system may, and such as shown in FIG. 5, generate potential avoiding paths (and may display such path or paths for viewing by the driver of the vehicle) to guide or direct the driver of the vehicle along a determined safe path through the tunnel that will avoid impacting the tunnel with the wide or tall load. Optionally, the system may determine such a safe path through the tunnel or low structure, and may control the steering of the vehicle as the vehicle passes through the low structure or tunnel to navigate the vehicle through the structure or tunnel, in order to make sure the wide or tall load does not impact the structure or tunnel. In situations where the system determines that there is no safe path available through or below the tunnel or structure, the system may apply the vehicle's brakes to stop the vehicle before the vehicle enters the tunnel or passes through or below the structure.

Optionally, the captured images for height determination may be composed within a long term image filtering. For example, superimposing images within minutes which show at least parts of the vehicle's silhouette, such as may be captured by conventional image recognition algorithm. Optionally, such height determination may be composed via triangulation or by comparing the ratio of the (known) vehicle's own height to the (unknown) baggage's height, such as discussed above.

Figure 9:
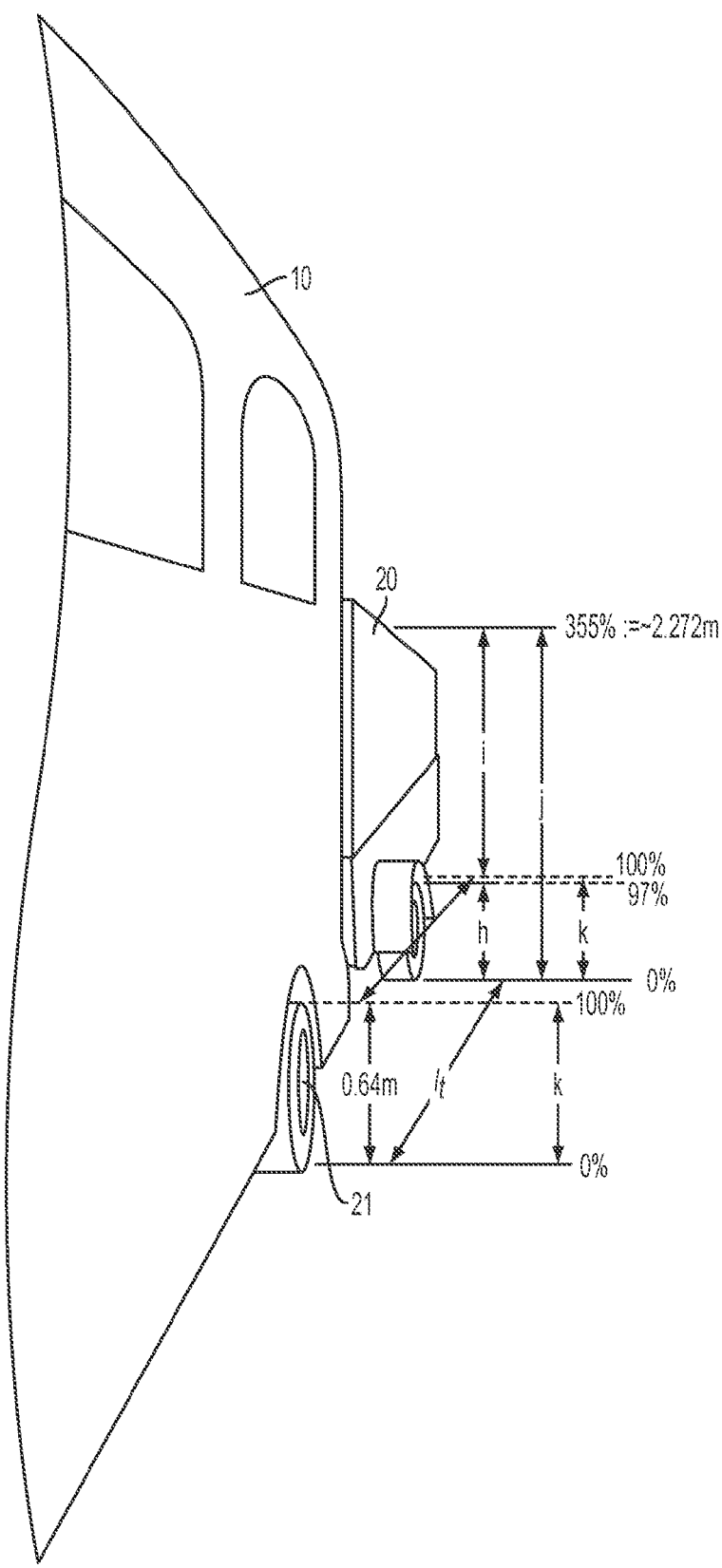
FIG. 9 shows an image of the rear of a vehicle 10 pulling a trailer 20 along a slight curve as captured by the vehicle's 10 side mirror camera, with the known heights of the pulling vehicle's rear tire 21 compared to the trailer's 20 height (j)

Optionally, the system may alternatively or additionally calculate the width and height clearance of a trailer that is attached at or hooked onto the vehicle. The trailer's own width and height (dimensions) may be entered by the driver via any HMI, or may be read out of a memory storage device (such as discussed in the systems described in U.S. provisional application Ser. No. U.S. 61/736,104, filed Dec. 12, 2012, which is hereby incorporated herein by reference in its entirety, or may be determined by a 3D world reconstruction and object detection algorithm of the subject vehicle's vision system analyzing the trailer (as an object subject for detection), or may be determined by a 2D height/width comparison (no full 3D world reconstruction required) of the subject trailer's height/width to objects having a known height visible in the same scene as like a ruler, yard stick or such or objects having a known height in ratio to the horizon such as like the sun's elevation at a certain place and time. From U.S. provisional application Ser. No. 61/736,104, incorporated above, just the trailer length determination/estimation can be achieved by trigonometric size comparing of image features distances to the trailer length, visible in the image. In there, the pulling vehicle is used as a known dimension image feature. It is suggested herein to use image features of the pulling vehicle for height comparison of image features of the trailer's height such as shown in FIG. 9. In there the known heights of the pulling vehicle's rear tire is compared to the trailer tire's height which appears smaller in distance. The rear tire is usually well detectable (during driving along curves) for being used as a detection feature of the trailer's image features. Since the distance $I_t$ is known and the distance of the (side mirror-) camera to the vehicle rear tire is known, the heights of the upper end at the distance of $I_t$ can be calculated. In the example of FIG. 9, the height of the trailer (j) is 355 percent of the reference height (k) (100 percent) of the vehicle's rear tire 21. The height (h) of the trailer is redundant in this example.

Figure 10:
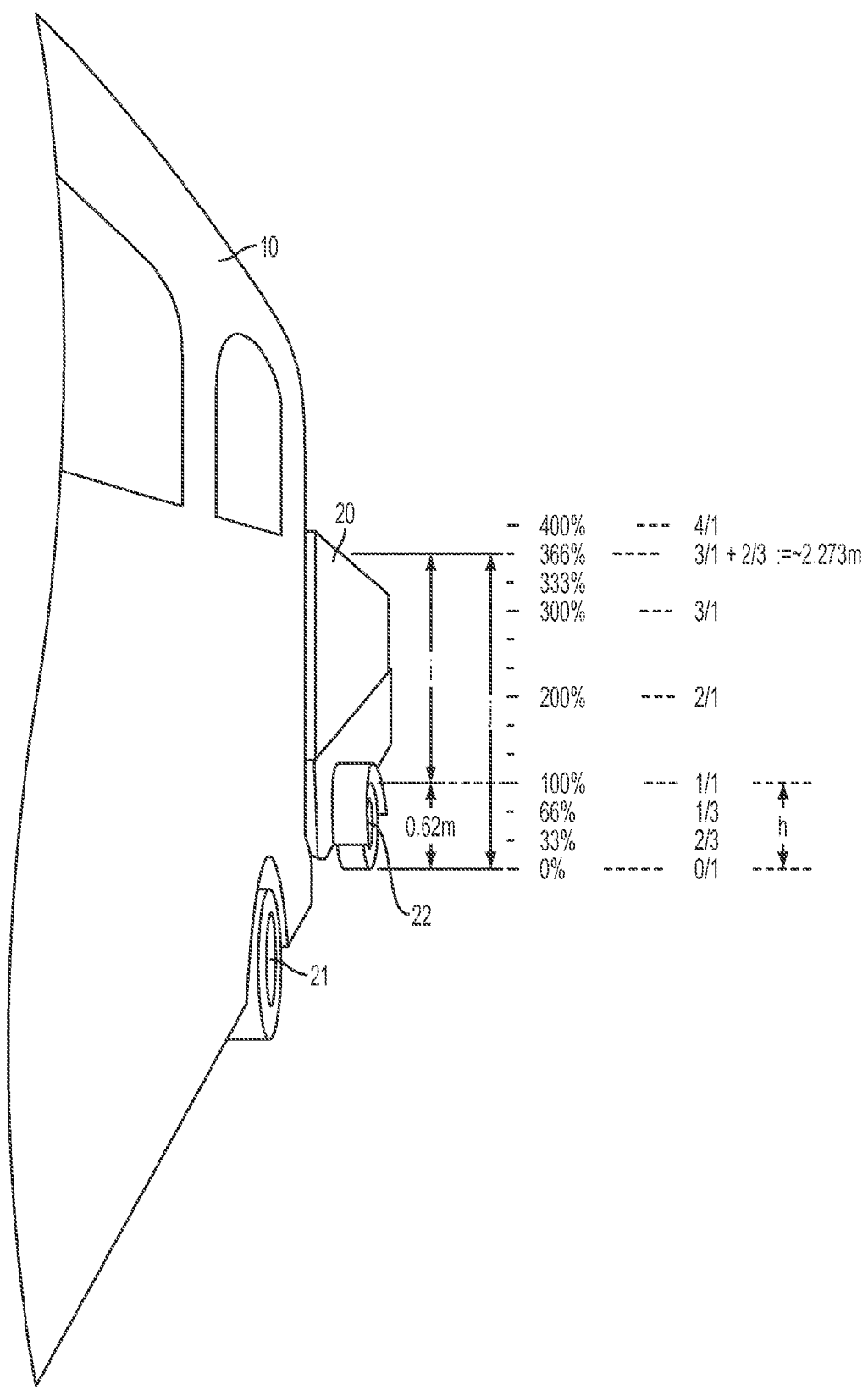
FIG. 10 shows an alternative height comparison to FIG. 9, showing the same scene, but with the height (h) of the trailer's tire 22 known (but not the distance $I_t$ to the vehicle's rear tire 21), and wherein, by comparing the tire's height (h) to the trailer's total height (j), the system is able to determine the trailer's height (j) at the tire's 22 distance.

FIG. 10 shows an alternative example. The height (h) of the trailer's tire 22 may be known (but not the distance $I_t$ to the vehicle's rear tire 21). By comparing the tire's height (h) to the trailer's total height (j), the system is able to determine the trailer's height (j) at the tire's 22 distance. In the example of FIG. 10, the trailer's height is three and two third times the height of the tire 22 which equates to:

3.66*0.620 m=2.273 m.

The image features of the vehicle are irrelevant for that approach.

Once the height of the trailer is determined, it may be stored in the above mentioned memory storage device. As already suggested in U.S. provisional application Ser. No. 61/736, 104, incorporated above, the determined width of the trailer may be reflected in overlays for driver assisting functions (as like maneuvering path planning) when the vehicle is being driven with a hooked on trailer. Optionally, the system may also reflect the height when providing overlays and drive assisting functions when driving with the hooked on trailer.

Figure 7:
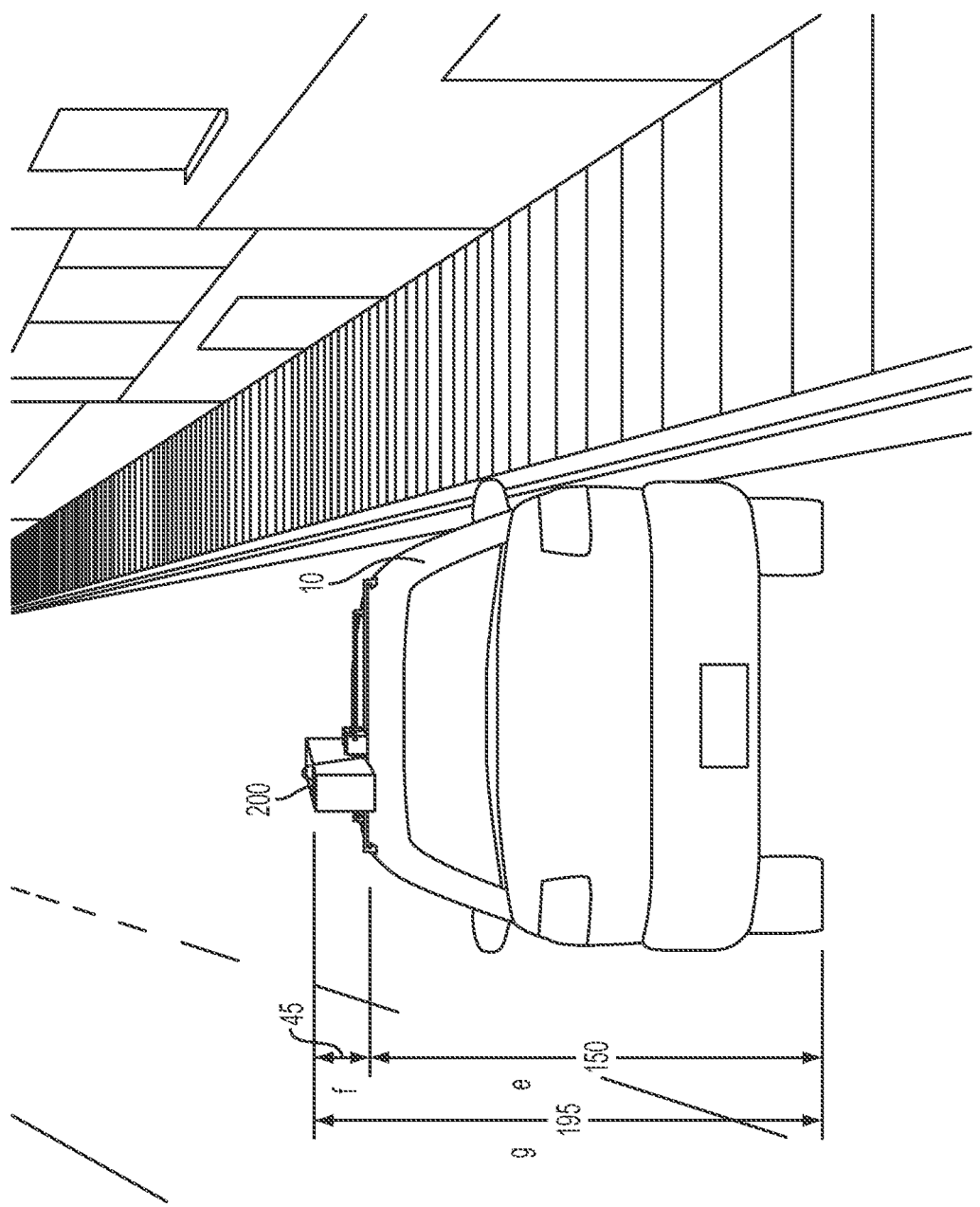
FIG. 7 shows an image from the rear of a subject vehicle (10) with a height (e) and having baggage (200) on the roof top of height (f), which adds to the total height (g), with the baggage at about the same (focal) distance as the vehicle.

Optionally, the system may use images of the subject vehicle that are captured by sensors of one or more other vehicles (which become transferred by car to car communication or car to periphery communication or the like), preferably other vehicle driving on the road behind the subject vehicle such as shown in FIG. 7, showing an image of the subject vehicle (10) from the rear of the vehicle, with the vehicle having height (e) and the baggage (200) on the roof top having height (f), which adds to the common (total) height (g). When the 3D world is known, the total height (g) of the vehicle is given directly. At the time no 3D world reconstruction is possible due to limited hardware and software features, the total height may be calculated by 2D height/width comparison (no full 3D world reconstruction required) of the (known) subject vehicle's height/width (e) with the baggage's unknown height (f) automatically. This works when the object detection software is capable of discriminating the vehicle from its environment and the baggage on top of the vehicle from the vehicle itself (and the baggage's environment).

Optionally, the height may be calculated by the other vehicle's processor or algorithm, whereby the other vehicle may communicate or transfer the height data instead of images to the subject vehicle.

Figure 8:
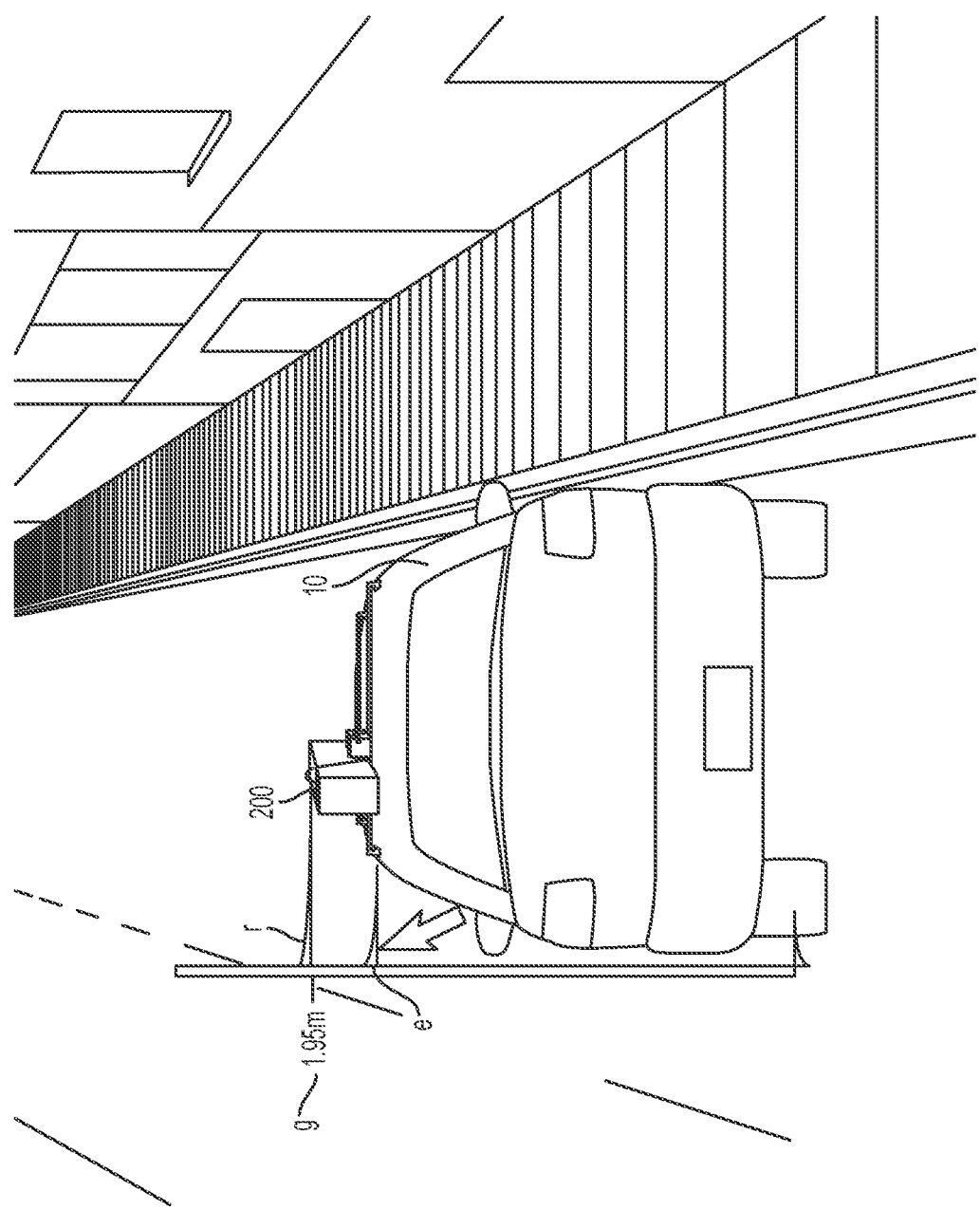
FIG. 8 shows the scene of FIG. 7, with the system providing virtual overlays (r), such as a ruler with different elevation markings, wherein the user may control (pick and place) the virtual compare overlay elevation markings (r) with the visible cursor for setting the vehicle elevation marking (e) and the total (vehicle plus baggage) elevation marking (g) and its footage point marking.

When the image processing software is incapable to discriminate the vehicle from its environment and the baggage on top of the vehicle from the vehicle (and the baggage's environment), the system is incapable to place sufficient size compare measures automatically for calculating the assemblage's (vehicle and baggage thereon) total height. Optionally, in that case, the system may provide virtual overlays as like a ruler with different elevation markings (r), such as shown in FIG. 8. The user may be able to control (pick and place) the virtual compare overlay elevation markings (r) within the image for distinguishing the vehicle's elevation (e) from the total (vehicle plus baggage) elevation (g).

Optionally, the system may use images of the subject vehicle that are captured by remote sensors, such as immobile installed cameras or sensors on buildings and facilities (which may be communicated or transferred by x2car communication (such as car-2-car communications) or periphery to car communication or the like), such as parking lot cameras or cameras on truck load/unload ramps and/or the like. Optionally, the height may be calculated by the remote facility's processor or algorithm, whereby the remote facility may communicate or transfer the height data instead of images to the subject vehicle.

Optionally, the system may use images of the subject vehicle that are captured by other remote sensors or cameras, such as by a handheld device with a camera (which may be transferred by x2car communication or periphery to car communication or by wireless communication or by near field communication or optical communication or by plugging in a transfer cable (supporting a communication bus/protocol/interface such as USB, Firewire, HDMI or the like) or the like), conventional digital handheld cameras, smart phone cameras or PDA cameras. Optionally, the height may be calculated by the handheld device processor or algorithm, whereby the handheld device may communicate or transfer the height data instead of images to the subject vehicle. Optionally, the program or app may be provided by the handheld device, or by the vehicle or vision system manufacturer or vendors or by aftermarket distributers. The actual program or app may be capable for being downloaded, updated, rented or the like. Optionally, the height may be calculated by capturing two or more images from two or more different viewpoints for running a 3D world reconstruction from the captured images.

In situations where the system is not done with detecting the vehicle-plus-baggage total height or is still waiting for other vehicle incoming image data, the status of the 'clearance warning' system may be indicated to the driver by any display means (such as a console display or a head up display or a mirror display or the like) as 'inactive.' As soon the subject vehicle's total height is present or determined, the clearance warning system's status may be indicated as 'active.'

Optionally, there may be peripheral facilities present that are also capable to receive and store the measured driving path height, which may be used by street maintenance services when sudden height decrease becomes reported on public road ways by clearance height detecting vehicles.

Thus, the present invention provides an alert system that is operable to determine both the vehicle height and vehicle width, with the system being operable to learn or determine the current height of the vehicle (such as the overall height of the vehicle as it is then loaded). The system may make such a size or height determination by using reflected images of the vehicle as reflected in a window or the like adjacent to or near the vehicle. The alert system may provide an alert or a passive and/or active driver assistance function based on the passing clearance for the vehicle relative to an overhead structure or object. The system may take additional loading height into account when the loaded vehicle is reflected in determining the height and width clearance at a narrow or low clearance structure or location, and may make such determinations while the vehicle is being driven towards the structure or location.

The control is operable to determine the height of a structure in the path of travel of the vehicle and to compare the determined structure height with the determined vehicle height (loaded or unloaded). The structure may comprise a tunnel or bridge or tree branch or the like at the road ahead of the vehicle, or the structure may comprise an entrance to a parking structure, and/or may comprise a hanging height indicator or bar that indicates the lowest height or clearance in the parking structure. Optionally, the control may determine the height of a structure in the path of travel of the vehicle by utilizing traffic sign recognition or character recognition algorithms to determine the height indicated via numbers on a clearance sign or the like that is located at or near or ahead of the structure. For example, the control may "read" such a clearance sign and utilize that numerical height dimension as the determined height, and may use such a height dimension in conjunction with image processing of image data representative of the structure itself to generate an appropriate size and shape of the tunnel or structure for use in determining a safe clearance path around or under or through the structure. Optionally, the control or system may be operable to detect railroad crossing signs or signals and may be operable to determine if a railroad crossing barrier is lowered ahead of the vehicle and/or if the lights at a railroad crossing are activated, whereby an alert may be generated to the driver of the vehicle that a train may be approaching a railroad crossing ahead of the vehicle.

Optionally, the camera of the vehicle may comprise a forward facing camera disposed at or behind the windshield of the vehicle (and viewing forward and through the windshield) or disposed at a front or forward portion of the vehicle, such as at the vehicle grill or front bumper or the like, or disposed at a side portion or elsewhere at the vehicle. Optionally, the camera may be part of a multi-camera system of the vehicle, such as part of a surround view or top-down view system of the vehicle (such as discussed below). Optionally, the camera may be part of a forward facing imaging (FFI) system of the vehicle that is operable to provide headlamp detection (where the system may detect headlamps in the field of view of the camera and may adjust or control the headlamps of the equipped vehicle responsive to such detection), lane tracking (where the system may detect lane markers present in the field of view of the camera to determine lane departure or lane change by the equipped vehicle), traffic sign detection and/or recognition (where the system may detect signs present in the field of view of the camera), vehicle detection and pedestrian detection (where the system may detect vehicles and/or pedestrians and/or the like present in the field of view of the camera and ahead of the vehicle and in the path of travel of the vehicle) and/or the like. Such an FFI system may include a common or single image processor that processes image data captured by the camera (and optionally also by other cameras of the vehicle) for such multiple functions or features.

Therefore, the present invention provides a vehicle alert system that is operable to determine or estimate an actual height of the subject vehicle (as the vehicle may be loaded) and to determine or estimate a clearance height of a structure or object in the path of travel of the vehicle, and, responsive to such determinations or estimations, the system may determine whether the vehicle is low enough to pass through or under the detected structure or object. The system thus provides enhanced driving assistance to the driver of the vehicle, particularly when the vehicle may have a load on its roof or top that the driver may have forgotten about. When an insufficient clearance situation is detected, the system may alert the driver to the potential hazard, such as by providing a visual alert, an audible alert or a haptic alert or the like. The system may utilize any suitable sensing device or devices, such as a camera or imaging sensor that is forward or rearward facing so as to capture images forward of the vehicle when the vehicle is traveling in a forward direction and/or capture images rearward of the vehicle when the vehicle is traveling in a rearward direction.

The camera or cameras may include or may be associated with an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, which is hereby incorporated herein by reference in its entirety.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in at least about 640 columns and 480 rows (at least about a 640× 480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and/or PCT Application No. PCT/US2012/048110, filed Jul. 25, 2012, and/or PCT Application No. PCT/CA2012/000378, filed Apr. 25, 2012, and/or PCT Application No. PCT/US2012/056014, filed Sep. 19, 2012, and/or PCT Application No. PCT/US12/57007, filed Sep. 25, 2012, and/or PCT Application No. PCT/US2012/061548, filed Oct. 24, 2012, and/or PCT Application No. PCT/US2012/062906, filed Nov. 1, 2012, and/or PCT Application No. PCT/US2012/063520, filed Nov. 5, 2012, and/or PCT Application No. PCT/US2012/064980, filed Nov. 14, 2012, and/or PCT Application No. PCT/US2012/066570, filed Nov. 27, 2012, and/or PCT Application No. PCT/US2012/066571, filed Nov. 27, 2012, and/or PCT Application No. PCT/US2012/068331, filed Dec. 7, 2012, and/or PCT Application No. PCT/US2012/071219, filed Dec. 21, 2012, and/or PCT Application No. PCT/US2013/022119, filed Jan. 18, 2013, and/or PCT Application No. PCT/US2013/026101, filed Feb. 14, 2013, and/or U.S. patent application Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional application Ser. No. 61/766,883, filed Feb. 20, 2013; Ser. No. 61/760,368, filed Feb. 4, 2013; Ser. No. 61/760,364, filed Feb. 4, 2013; Ser. No. 61/758,537, filed Jan. 30, 2013; Ser. No. 61/754,8004, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/676,405, filed Jul. 27, 2012; Ser. No. 61/666,146, filed Jun. 29, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/601,651, filed Feb. 22, 2012; and/or Ser. No. 61/601,669, filed Feb. 22, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176;

6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional application Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and/or PCT Application No. PCT/US2012/066571, filed Nov. 27, 2012, and/or U.S. patent application Ser. No. 13/333,337, filed Dec. 21, 2011, and/or U.S. provisional application Ser. No. 61/615,410, filed Mar. 26, 2012, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690, 268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicle clearance alert system comprising:
at least one camera disposed at a vehicle and having an exterior field of view in a direction of travel of the vehicle, wherein said at least one camera is operable to capture image data;
a control having an image processor operable to process image data captured by said at least one camera;
wherein, responsive to image processing of image data captured by said at least one camera, said control is operable to determine a height dimension of a structure in the path of travel of the vehicle;
wherein said control is operable, responsive to (i) the determined height dimension of the structure in the path of travel of the vehicle and (ii) a height dimension of the vehicle, to determine if there is sufficient clearance between the structure and the vehicle for the vehicle to pass under the structure;
wherein, responsive to a determination that there is not sufficient clearance between the structure and the vehicle for the vehicle to pass under the structure, said vehicle clearance alert system is operable to generate an alert to the driver of the vehicle; and
wherein said control is operable to determine a height dimension of the vehicle via processing of captured image data that is representative of at least one of (i) a reflected image of the vehicle and (ii) a shadow of the vehicle.

2. The vehicle clearance alert system of claim 1, wherein said at least one camera comprises a forward facing camera having a field of view in a forward direction of travel of the vehicle.

3. The vehicle clearance alert system of claim 1, wherein said control is operable responsive to image data captured by at least one remote imaging sensor capturing the vehicle at least in part.

4. The vehicle clearance alert system of claim 1, wherein the height of the vehicle is stored in a memory of said control.

5. The vehicle clearance alert system of claim 1, wherein said control is operable to determine a height dimension of a structure in the path of travel of the vehicle responsive at least in part to information generated by a navigation system of the vehicle.

6. The vehicle clearance alert system of claim 1, wherein said control is operable to determine a height dimension of a structure in the path of travel via determining a height of the structure above the ground.

7. The vehicle clearance alert system of claim 1, wherein said control is operable to determine a height dimension of a structure in the path of travel via determining a height dimension at a sign at or near the structure.

8. The vehicle clearance alert system of claim 1, wherein, responsive to a determination that there is not sufficient clearance between the structure and the vehicle for the vehicle to pass under the structure, said alert system is operable to generate a graphic overlay that overlays a displayed image to visually alert the driver of the vehicle of insufficient clearance.

9. The vehicle clearance alert system of claim 1, wherein, responsive to a determination that there is not sufficient clearance between the structure and the vehicle for the vehicle to pass under the structure, said alert system is operable to control at least one of (i) steering of the vehicle and (ii) braking of the vehicle.

10. The vehicle clearance alert system of claim 1, wherein, responsive to a determination that there is not sufficient clearance between the structure and the vehicle for the vehicle to pass under the structure, said control is operable to determine a clearance path around or through the structure.

11. The vehicle clearance alert system of claim 10, wherein said control is operable to guide or direct the driver of the vehicle along the determined clearance path.

12. The vehicle clearance alert system of claim 11, wherein said control is operable to control the steering of the vehicle as the vehicle passes around or through the structure.

13. The vehicle clearance alert system of claim 12, wherein, responsive to a determination that there is no clearance path available around or through the structure, said control is operable to control braking of the vehicle.

14. A vehicle clearance alert system comprising:
at least one camera disposed at a vehicle and having an exterior field of view in a direction of travel of the vehicle, wherein said at least one camera is operable to capture image data;

a control having an image processor operable to process image data captured by said at least one camera;

wherein, responsive to image processing of image data captured by said at least one camera, said control is operable to determine a height dimension of a structure in the path of travel of the vehicle;

wherein said control is operable, responsive to (i) the determined height dimension of the structure in the path of travel of the vehicle and (ii) a height dimension of the vehicle, to determine if there is sufficient clearance between the structure and the vehicle for the vehicle to pass under the structure;

wherein, responsive to a determination that there is not sufficient clearance between the structure and the vehicle for the vehicle to pass under the structure, said vehicle clearance alert system is operable to generate an alert to the driver of the vehicle; and wherein said control is operable to determine a height dimension of the vehicle with an object disposed thereon via processing of captured image data and based at least in part on a known height of the vehicle when no object is disposed thereon, and wherein the height of the vehicle is stored in a memory of said control.

15. A vehicle clearance alert system comprising:

at least one camera disposed at a vehicle and having an exterior field of view in a direction of travel of the vehicle, wherein said at least one camera is operable to capture image data;

a control having an image processor operable to process image data captured by said at least one camera;

wherein, responsive to image processing of image data captured by said at least one camera, said control is operable to determine a height dimension of a structure in the path of travel of the vehicle;

wherein said control is operable, responsive to (i) the determined height dimension of the structure in the path of travel of the vehicle and (ii) a height dimension of the vehicle, to determine if there is sufficient clearance between the structure and the vehicle for the vehicle to pass under the structure;

wherein, responsive to a determination that there is not sufficient clearance between the structure and the vehicle for the vehicle to pass under the structure, said vehicle clearance alert system is operable to generate an alert to the driver of the vehicle;

wherein the height of the vehicle is stored in a memory of said control; and wherein said control is operable to determine a height dimension of the vehicle with an object disposed thereon via processing of captured image data that is representative of at least one of (i) a reflected image of the vehicle with the object disposed thereon and (ii) a shadow of the vehicle with the object disposed thereon.

16. A vehicle clearance alert system comprising:

a forward facing camera disposed at a vehicle and having an exterior field of view in a forward direction of travel of the vehicle, wherein said camera is operable to capture image data;

a control having an image processor operable to process image data captured by said camera;

wherein, responsive to image processing of image data captured by said camera, said control is operable to determine a height dimension of a structure in the path of travel of the vehicle;

wherein said control is operable, responsive to (i) the determined height dimension of the structure in the path of travel of the vehicle and (ii) a height dimension of the vehicle, to determine if there is sufficient clearance between the structure and the vehicle for the vehicle to pass under the structure;

wherein, responsive to a determination that there is not sufficient clearance between the structure and the vehicle for the vehicle to pass under the structure, said vehicle clearance alert system is operable to generate an alert to the driver of the vehicle, and wherein said alert comprises at least one of (i) a visual alert, (ii) an audible alert and (iii) a haptic alert; and wherein said control is operable to determine a height dimension of the vehicle with an object disposed thereon via processing of captured image data and based at least in part on a known height of the vehicle when no object is disposed thereon.

17. A vehicle clearance alert system comprising:

a forward facing camera disposed at a vehicle and having an exterior field of view in a forward direction of travel of the vehicle, wherein said camera is operable to capture image data;

a control having an image processor operable to process image data captured by said camera;

wherein, responsive to image processing of image data captured by said camera, said control is operable to determine a height dimension of a structure in the path of travel of the vehicle;

wherein said control is operable, responsive to (i) the determined height dimension of the structure in the path of travel of the vehicle and (ii) a height dimension of the vehicle, to determine if there is sufficient clearance between the structure and the vehicle for the vehicle to pass under the structure;

wherein, responsive to a determination that there is not sufficient clearance between the structure and the vehicle for the vehicle to pass under the structure, said vehicle clearance alert system is operable to generate an alert to the driver of the vehicle, and wherein said alert comprises at least one of (i) a visual alert, (ii) an audible alert and (iii) a haptic alert; and wherein said control is operable to determine a height dimension of the vehicle with an object disposed thereon via processing of captured image data that is representative of at least one of (i) a reflected image of the vehicle with the object disposed thereon and (ii) a shadow of the vehicle with the object disposed thereon.

18. The vehicle clearance alert system of claim 17, wherein, responsive to a determination that there is not sufficient clearance between the structure and the vehicle for the vehicle to pass under the structure, said alert system is operable to generate a graphic overlay that overlays a displayed image to visually alert the driver of the vehicle of insufficient clearance.

19. The vehicle clearance alert system of claim 17, wherein, responsive to a determination that there is not sufficient clearance between the structure and the vehicle for the vehicle to pass under the structure, said control is operable to determine a clearance path around or through the structure, and wherein said control is operable to guide or direct the driver of the vehicle along the determined clearance path.

20. The vehicle clearance alert system of claim 19, wherein, responsive to a determination that there is no clearance path available around or through the structure, said control is operable to control braking of the vehicle.

21. A vehicle clearance alert system comprising:
a forward facing camera disposed at a vehicle and having an exterior field of view in a forward direction of travel of the vehicle, wherein said camera is operable to capture image data;
a control having an image processor operable to process image data captured by said camera;
wherein, responsive to image processing of image data captured by said camera, said control is operable to determine a height dimension of a structure in the path of travel of the vehicle;
wherein said control is operable, responsive to (i) the determined height dimension of the structure in the path of travel of the vehicle and (ii) a height dimension of the vehicle, to determine if there is sufficient clearance between the structure and the vehicle for the vehicle to pass under the structure;
wherein, responsive to a determination that there is not sufficient clearance between the structure and the vehicle for the vehicle to pass under the structure, said vehicle clearance alert system is operable to generate an alert to the driver of the vehicle;
wherein said forward facing camera is part of a forward facing imaging system and is operable to at least one of (i) detect a headlamp present in the field of view of said camera, (ii) track lane markers present in the field of view of said camera, (iii) detect traffic signs present in the field of view of said camera, (iv) detect vehicles present in the field of view of said camera and (v) detect pedestrians present in the field of view of said camera; and
wherein said control is operable to determine a height dimension of the vehicle with an object disposed thereon via processing of captured image data and based at least in part on a known height of the vehicle when no object is disposed thereon.

22. The vehicle clearance alert system of claim 21, wherein said control is operable to determine a height dimension of the vehicle with an object disposed thereon via processing of captured image data that is representative of at least one of (i) a reflected image of the vehicle with the object disposed thereon and (ii) a shadow of the vehicle with the object disposed thereon.

23. The vehicle clearance alert system of claim 21, wherein, responsive to a determination that there is not sufficient clearance between the structure and the vehicle for the vehicle to pass under the structure, said alert system is operable to generate a graphic overlay that overlays a displayed image to visually alert the driver of the vehicle of insufficient clearance.

24. The vehicle clearance alert system of claim 21, wherein, responsive to a determination that there is not sufficient clearance between the structure and the vehicle for the vehicle to pass under the structure, said control is operable to determine a clearance path around or through the structure, and wherein said control is operable to guide or direct the driver of the vehicle along the determined clearance path.

25. The vehicle clearance alert system of claim 24, wherein, responsive to a determination that there is no clearance path available around or through the structure, said control is operable to control braking of the vehicle.

* * * * *